US006282286B1

(12) United States Patent
Reesor et al.

(10) Patent No.: US 6,282,286 B1
(45) Date of Patent: Aug. 28, 2001

(54) NONLINEAR PROCESSOR FOR ACOUSTIC ECHO CANCELLER WITH BACKGROUND NOISE PRESERVATION AND LONG ECHO TAIL SUPPRESSION

(75) Inventors: Gordon J. Reesor, Russell; Gary Qu Jin, Kanata; Thomas Qian, Nepean, all of (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/143,973

(22) Filed: Aug. 31, 1998

(30) Foreign Application Priority Data

Oct. 24, 1997 (GB) ................................................. 9722382

(51) Int. Cl.⁷ ............................. H04B 3/20; H04M 9/08; G10L 11/02
(52) U.S. Cl. ........................ 379/410; 455/570; 704/233
(58) Field of Search ................................. 379/406–410, 379/420; 455/570; 370/291

(56) References Cited

U.S. PATENT DOCUMENTS

| 5,084,865 | * | 1/1992 | Koike | 370/289 |
| 5,274,705 | | 12/1993 | Younce et al. | |
| 5,307,405 | * | 4/1994 | Sih | 379/410 |
| 5,475,731 | * | 12/1995 | Rasmusson | 379/3 |
| 5,561,668 | | 10/1996 | Genter | 370/32.1 |
| 5,598,468 | * | 1/1997 | Ammicht et al. | 379/410 |
| 5,737,408 | * | 4/1998 | Hasegawa | 379/390 |
| 5,752,229 | * | 5/1998 | Duttweiler et al. | 704/270 |
| 5,771,440 | * | 6/1998 | Sukhu et al. | 455/63 |
| 5,920,834 | * | 7/1999 | Sih et al. | 704/233 |
| 5,949,888 | * | 9/1999 | Gupta et al. | 381/66 |

FOREIGN PATENT DOCUMENTS

| WO92/02994 | 2/1992 | (WO) . | |
| WO93/09609 | 5/1993 | (WO) | H04B/3/23 |
| WO96/27951 | 9/1996 | (WO) . | |
| WO97/23055 | 6/1997 | (WO) | H04B/3/23 |

OTHER PUBLICATIONS

Abousaada et al "Performance analysis of an efficient AIFIR echo–tail canceller" Aug. 14, 1990, 552–555, IEEE.*

* cited by examiner

Primary Examiner—Tālivaldis Ivars Šmits
(74) Attorney, Agent, or Firm—Marks & Clerk

(57) ABSTRACT

A nonlinear processor (NLP) for selectively removing or reducing residual echo signals from an acoustic echo canceller associated with a telephony terminal is provided. Low level background noise and near end speech signals pass through the NLP structure substantially unaltered. Distortion, background noise above a preset threshold and echo signals including long duration echoes are replaced with a linear combination of previous noise data.

10 Claims, 4 Drawing Sheets

NONLINEAR PROCESSOR FOR ACOUSTIC ECHO CANCELLER WITH BACKGROUND NOISE PRESERVATION AND LONG ECHO TAIL SUPPRESSION

FIELD OF THE INVENTION

This invention pertains to the field of adaptive, speech echo cancellation, and more particularly to acoustic echo cancellation for speaker-phones and voice conferencing systems utilizing a nonlinear processor (NLP).

BACKGROUND

Nonlinear processors (NLPs) are used in echo cancellation generally, and in particular for echo cancellation of acoustic speech signals. Speech echo cancellation can be grouped into two major categories: network echo cancellation and acoustic echo cancellation. The primary difference between acoustic echo signals and network echo signals is that an acoustic echo channel includes both loudspeaker and microphone transducers that convert signals to and from audible (acoustic) sound signals, as opposed to network echo signals that are generated by electric circuits (hybrids). The acoustic type typically has high background noise signals present from the surrounding environment that makes application of prior art nonlinear processors unfavorable.

PRIOR ART

The term "nonlinear processor" or NLP can be used to describe a signal processing circuit or algorithm that is placed in the speech path after echo cancellation, so as to provide further attenuation or removal of residual echo signals that cannot be cancelled completely by an echo canceller. A non-linearity, a distortion, or an added noise signal are examples of signals that can not be fully cancelled by an echo canceller, and these signals are typically removed or attenuated by a nonlinear processor. One example of a prior art NLP is a "center clipper" in which all signal samples with amplitude less than a threshold value are set to zero. This method has been used for network echo cancellation for many years by many different equipment suppliers. A description of the operation of such an NLP has been included in the appendix of the ITU-T G.165 recommendation as a reference design for an NLP. A known problem with this type of NLP is the so called "noise gating" phenomena wherein a party listening to the resulting speech signals, after a center clipping NLP, hears the background noise signals disappearing and then reappearing during periods of activation and de-activation of the NLP.

Improvements upon this center clipper method that reduce or eliminate the "noise gating" problem have been introduced in recent years. These improvements are primarily used for network type echo cancelers in which background noise levels are typically very low in comparison to the noise levels experienced with acoustic echo signals. An example of a prior art NLP improvement is a center clipper method combined with the injection of a matched artificial noise source to mask the removal of noise signals by the center clipper. Yet another example is a variable attenuator that provides a soft-switched transition between on/off states of signal attenuation with complementary soft-switched injection of artificial noise. U.S. Pat. No. 5,274,705, which issued Dec. 28, 1993 to Younce et al, describes another example of an improved NLP using dual thresholds in the NLP transfer function which allows transparent transfer of low level noise signals if below the low threshold, and transparent transfer of large signals if above an upper threshold while removing or modifying any signals in-between the two thresholds.

Problems with all of the aforementioned methods arise when dealing with signals from an acoustic environment because of the higher noise levels. Noise injection methods are not typically used because the character of the background noise changes very noticeably if an artificial noise is injected in place of the original noise. Variable attenuation methods without noise injection appear to be most commonly used for the control of residual echo in acoustic echo cancelers. This appears to be an extension of methods used previously by half-duplex speakerphones and network echo suppressors which used complementary attenuators to provide switched loss to control echo. The use of echo cancellation for a "full duplex" hands-free telephone appears to also make use of prior art complementary attenuators with reduced attenuation "depth" to make the connection close to full duplex, or perhaps, subjectively, "full duplex". Some other implementations appear to allow complete full-duplex communication some of the time (e.g. during double-talk periods), while providing some extra attenuation control of echo residual during other periods of time (e.g. single talk periods). All of these methods cause audible changes in background noise signals producing some degradation of overall subjective performance.

The prior art dual threshold method when applied to acoustic background noise signals, produces noticeable levels of extra signal distortion. This distortion is caused by the changes made to signals when the NLP is on. This audible distortion changes the character of the background noise during speech from the far end side, and can best be described as a raspy type noise with some high frequency components that sound different than a typical background noise. Note as used in this description the far end talker is the party who is also listening to the resulting signal after the NLP.

Another problem with the prior art NLP is that it has no control over a long echo path environment. To save cost most echo cancelers can only deal with a short echo length (e.g. 128 ms or less). In some acoustic environments, the echo can last for about 0.5 to 1 sec. Although, in most cases, the echo residual is very small after 128 ms, when both sides of telephone line are quiet, even a very small echo residual is noticeable. After the loudspeaker has been quiet for over ½ sec, the echo may still be present at the microphone input. The echo residual is treated as near-end single talk by the speaker-phone, and therefore the NLP will not attenuate this signal.

SUMMARY OF THE INVENTION

The method used in the present invention builds upon the dual threshold method. The NLP turns on only if both a double talk condition and an echo suppression requirement are met.

The present invention further relates to a method of reducing the level of extra signal distortion by processing signals in a different manner than the methods described in prior art NLP designs. The signal will be transparent if it is detected to be noise, otherwise a noise prediction value is sent out.

In the present invention, the long echo residual is dealt with by the new NLP structure. In lab tests, the echo residual is significantly reduced with the new NLP structure, even in the case when echo signals last up to 1 sec. and the adaptation algorithm can only deal with 100 ms echo length.

Briefly, the NLP structure of the present invention determines whether the residual signal from the echo canceller is greater or less than an estimated noise level. If it is less than the estimated noise level the residual signal is passed through the NLP substantially unchanged. If the residual signal is greater than the estimated noise level it is further evaluated to determine whether or not it represents a near-end speech signal. If it is speech as in near-end single talk or double talk the residual signal is again passed through the NLP unchanged. If, however the incoming signal is echo residual or long term echo the NLP outputs a low level noise signal which represents a prediction based on previous noise samples.

Therefore in accordance with a first aspect of the present invention there is provided a non linear processor (NLP) for use with an acoustic echo canceller associated with a telephone terminal to selectively reduce residual signals therefrom. The NLP comprises: a first input to receive the residual signal; a second input to receive a reference signal representing a signal from a far end user; a third input for receiving a near end signal from a microphone in the terminal; an output for delivering a NLP output to a far end user; a NLP switch, switchable between a first position wherein the residual signal is passed directly to the output and a second position wherein a signal representing a previous noise signal is delivered to the output; noise decision means to determine whether the residual signal is above a noise level and if not to switch the NLP switch to the first position; and NLP decision means cooperating with the noise decision means to switch the NLP switch to the first position when the residual signal contains near end speech and to the second position otherwise.

In a preferred embodiment the decision means incorporates an echo suppression threshold means which determined whether the residual signal is a long echo which was not cancelled by the echo canceller. If it is a long echo the switch remains in the second position wherein low level noise data is provided to Sout.

In accordance with a second aspect of the present invention there is provided a method of selectively reducing a residual signal from an acoustic echo canceller associated with a telephone terminal. The method comprises: providing the residual signal to noise decision means for comparison with an estimated noise level; passing the residual signal directly through the NLP if it is less than the estimated noise level; passing the residual signal to further decision means if it is greater than the estimated noise level whereat the residual signal is caused to be passed through the NLP if it is a near end speech signal otherwise a signal representing a previous noise signal is output from the NLP.

BRIEF DESCRIPTION OF THE DRAWINGS

The invention will now be described in greater detail having reference to the attached drawings wherein.

DETAILED DESCRIPTION OF THE INVENTION

Figure 1:
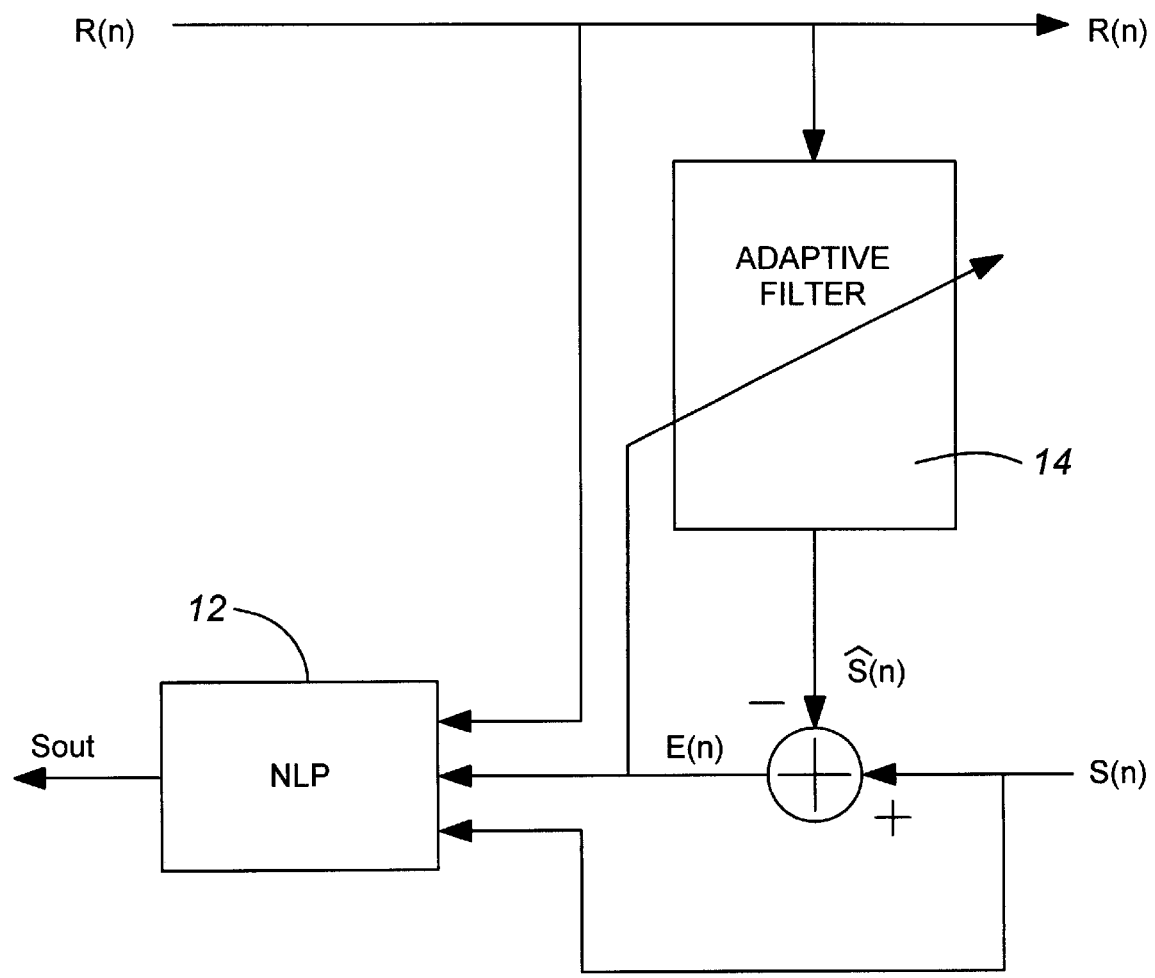
FIG. 1 shows a typical acoustical echo canceller with an incorporated NLP.

FIG. 1 shows an acoustical echo canceller having an incorporated NLP 12. In FIG. 1, S(n) is the near-end signal, R(n) is the far-end signal used as reference signal for the adaptive filter 14, and E(n) is the echo residual which is the difference between S(n) and its estimation value S(n).

Figure 2:
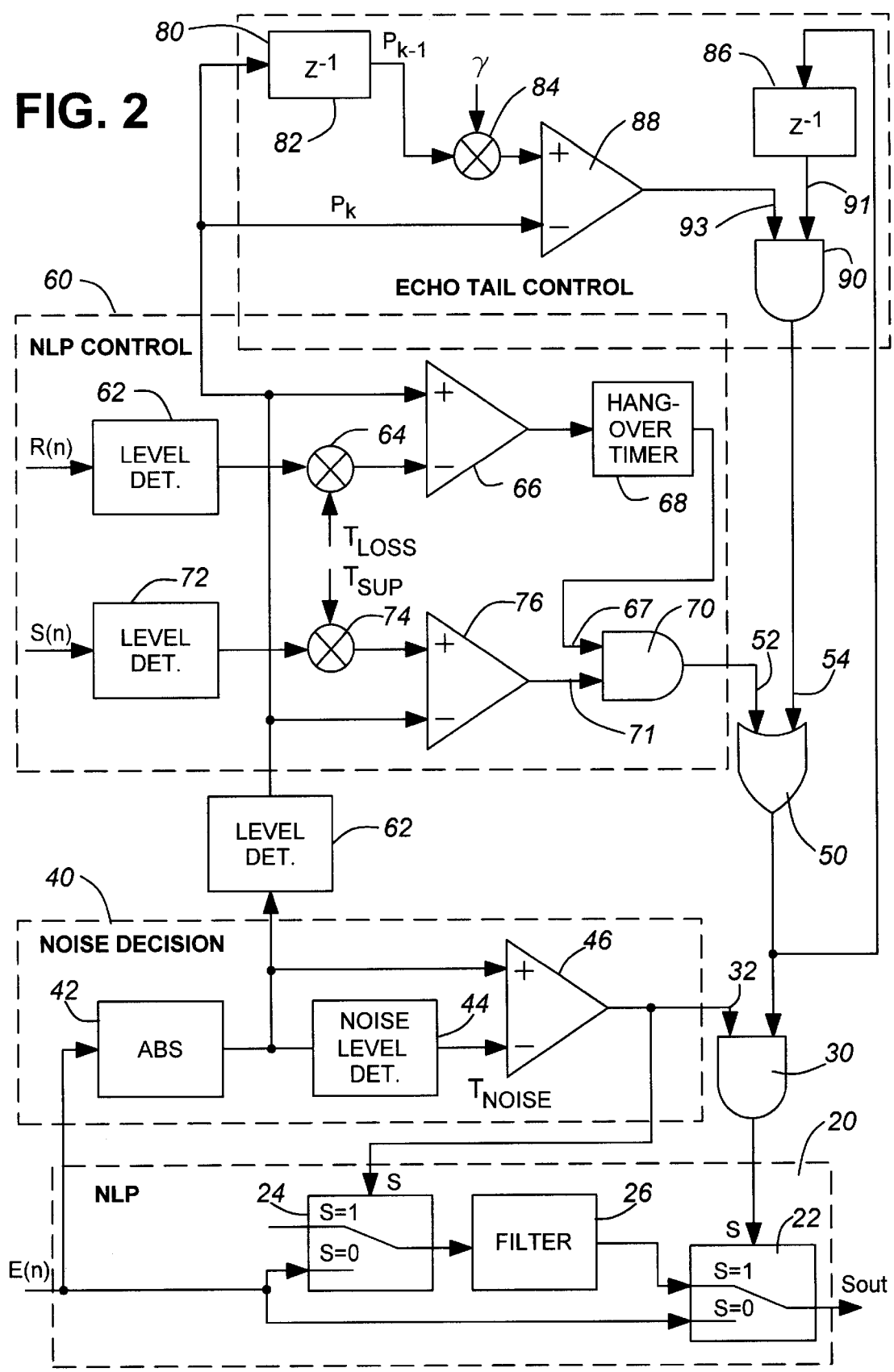
FIG. 2 is a block diagram of the NLP structure according to the present invention.

FIG. 2 shows the implementation of the new NLP structure, which is composed of four parts: the main NLP block 20 for signal input and output; the NOISE DECISION circuit 40 to check whether the input signal is noise or an active signal; the NLP CONTROL 60 to turn the NLP "ON" and "OFF"; and the ECHO TAIL CONTROL 80 to check whether the switch of NLP from "ON" to "OFF" is caused by the near end signal or the echo residue being too long to be cancelled by the adaptive filter 14.

As shown in FIG. 2 the echo residual signal E(n) is supplied to the NLP block 20 and to the noise decision circuit 40. The NLP block 20 includes switch 22, switch 24 and filter 26. The activation of switch 22 is controlled by the output of AND Gate 30 such that when the output of Gate 30 is "1" the output of switch 22 is provided by the filter 26 i.e. S=1 and when the output of AND Gate 30 is "0" the output of switch 22 is a direct passthrough of E(n). This is shown in FIGS. 2 as S=0. Switch 24 is controlled by the output of comparator 46 of noise decision block 40 such that a logical "1" to switch 24 causes the switch to provide a "0" input to filter 26 and a logical "0" to switch 24 causes E(n) to be supplied to filter 26.

The noise decision block 40 includes absolute signal detector (ABS) 42, noise level detector 44 and comparator 46. The purpose of the noise decision block 40 is to monitor the residual echo E(n) with reference to an estimated noise level. When the level of E(n) is lower than the noise level ($T_{noise}$) the output of comparator 46 is a "0". The noise level can be estimated with any common, noise-level detection algorithm implemented by noise level detector 44 whose output is $T_{noise}$. The "0" at the output of comparator 46 is supplied to one input 32 of AND gate 30 which switches switch 22 to S=0 and as previously discussed the residual echo signal E(n) is passed directly through the NLP structure. Thus, any residual echo whose level is lower than a predetermined noise threshold is not altered by the NLP. This "0" at the output of comparator 46 is also provided to switch 24 so that in accordance with the previous discussion E(n) is also supplied to the input of filter 26. Because switch 22 is in position s=0, E(n) is not connected to Sout but rather is the output of filter 26. The filter 26 is normally a low-cost FIR filter with low-pass characteristics. It takes the noise samples in E(n) signal, smooths them and subsequently outputs them as a noise predicted value.

If the value of E(n) is greater than the predetermined noise threshold the output of comparator 46 is a "1" and this "1" appears at input 32 of AND gate 30 as well as to switch 24 thereby switching switch 24 to S=1. In this configuration switch 24 receives the "0" input which is supplied to filter 26. The operation of switch 22, in this mode, is now dependent on the NLP decision coming out of OR gate 50. As illustrated in FIG. 2, OR gate 50 has two inputs, input 52 from NLP control block 60 and input 54 from the echo tail control 80.

Looking first at the NLP control block 60 which has two comparator circuits, one for double talk detection and the other for a situation wherein the echo canceller shown in FIG. 1 does not provide enough echo cancellation. This could be because of long echo, because the adaptive algorithm does not converge sufficiently or because of a small echo with a small double talk. The double talk comparator circuit includes level detector 62, loss threshold 64, comparator 66 and hangover timer 68. When the value of E(n) is greater than the noise threshold but is not near-end speech the value of E(n) will be less than the level of R(n) which is multiplied by a loss threshold. ($T_{loss}$) Under these conditions the output of comparator 66 will be a "1" which is supplied to input 67 of AND gate 70. Under the same conditions, i.e. no near-end speech, the value of E(n) is smaller than the value of S(n) multiplied by a suppression loss $T_{sup}$ and in this situation the output of comparator 76 is a "1". Thus the output of AND gate 70 is also a "1" and hence the NLP decision is a "1" which, in turn means that switch 22 is in the position S=1 and the output of the NLP structure is a filtered value of a previous noise sample. Thus any residual echo is reduced or removed from the signal by the NLP before it is sent to a far-end user.

If double talk occurs i.e. the far-end speaker is talking and the near-end speaker talks as well, the signal E(n) now represents active voice communication and is to be passed directly through the NLP structure. When there is a double talk situation the signal at the negative input of comparator 66 rises above the level of R(n) multiplied by $T_{loss}$ and the output of comparator 66 switches to a "0". Hangover timer 68 simply delays for a preselected interval the switchover from a "0" to a "1" to extend the detect time of double talk. In any event, a "0" on one of the inputs to AND gate 70 results in a "0" being provided to one of the inputs to OR gate 50. Under normal circumstances the output of AND gate 90 in the echo tail control 80 will also be a "0" so that AND gate 30 will also switch to a "0" output resulting in switch 22 switching to S=0 and Sout=E(n). Thus, the residual echo which now includes speech from a near-end user is passed through the NLP structure unaltered.

Another scenario which might arise is when the far-end user is silent but the near-end user is speaking i.e. near-end single talk, again this residual signal is to be passed through the NLP structure without alteration. This situation is covered by the aforementioned structure and the structure comprising level detector 72, echo suppression threshold 74, and comparator 76. In this situation the level of S(n) multiplied with $T_{sup}$ drops below the level of E(n) and the output of comparator 76 switches from a "1" to a "0". This "0" on input 71 of AND gate 70 results in a "0" to input 52 of OR gate 50 and again, providing the output of echo tail AND gate 90 is a "0", switch 22 is switched to S=0 and the value of E(n) is provided to Sout.

There is one additional condition which must be considered and that is the situation wherein the near-end signal appears to be near-end speech but is, in fact, a long duration echo such as might occur with a speaker phone or the like. The adaptive filter in the echo canceller shown in FIG. 1 and as discussed previously normally only operates on a short echo length e.g. 128 ms. or less. An echo which lasts longer than this time interval will appear in residual echo signal E(n) and without the benefit of the echo tail control of the present invention would be passed through the structure on the false decision that it represents near-end speech. Thus, when comparator 76 switches from "1" to a "0" output indicating near-end speech, the output from AND gate 70 to OR gate 50 is a "0". At this time, the echo tail control block 80 comprising residual level delay82, threshold 84, NLP decision delay 86 and comparator 88 determine whether the current value of the level of E(n), i.e. $P_k$ in FIG. 2 is greater or less than a previous value of $P_k$ i.e. $P_{k-1}$. If the previous value, $P_{k-1}$ (with a threshold γ) is greater than $P_k$ which would suggest a decaying signal, i.e. a long-term echo, comparator 88 outputs a "1". Since the output of OR gate 50 is also a "1" from the previous time, this "1" is supplied through decision delay block 86 to input 91 of AND gate 90. The other input 93 of AND gate 90 is also a "1" by virtue of the output of comparator 88. Thus, OR gate 50 continues to output a "1" so that Sout is the filtered noise value rather than E(n) when E(n) is above the noise level. When the value of E(n) rises such that $P_k$ is greater or equal to $P_{k-1}$ multiplied by γ, comparator 88 switches to a "0" output and as a result NLP decision will become "0" and E(n) will again pass directly through to Sout. This rise in E(N) could, for example, indicate a situation wherein there is a near-end speaker and/or a double talk situation.

The echo tail control block 80 provides the added functionality of removing echoes having a long tail which would otherwise be passed through the NLP structure on the basis that it was misinterpreted as being a near-end speech.

Figure 3A:
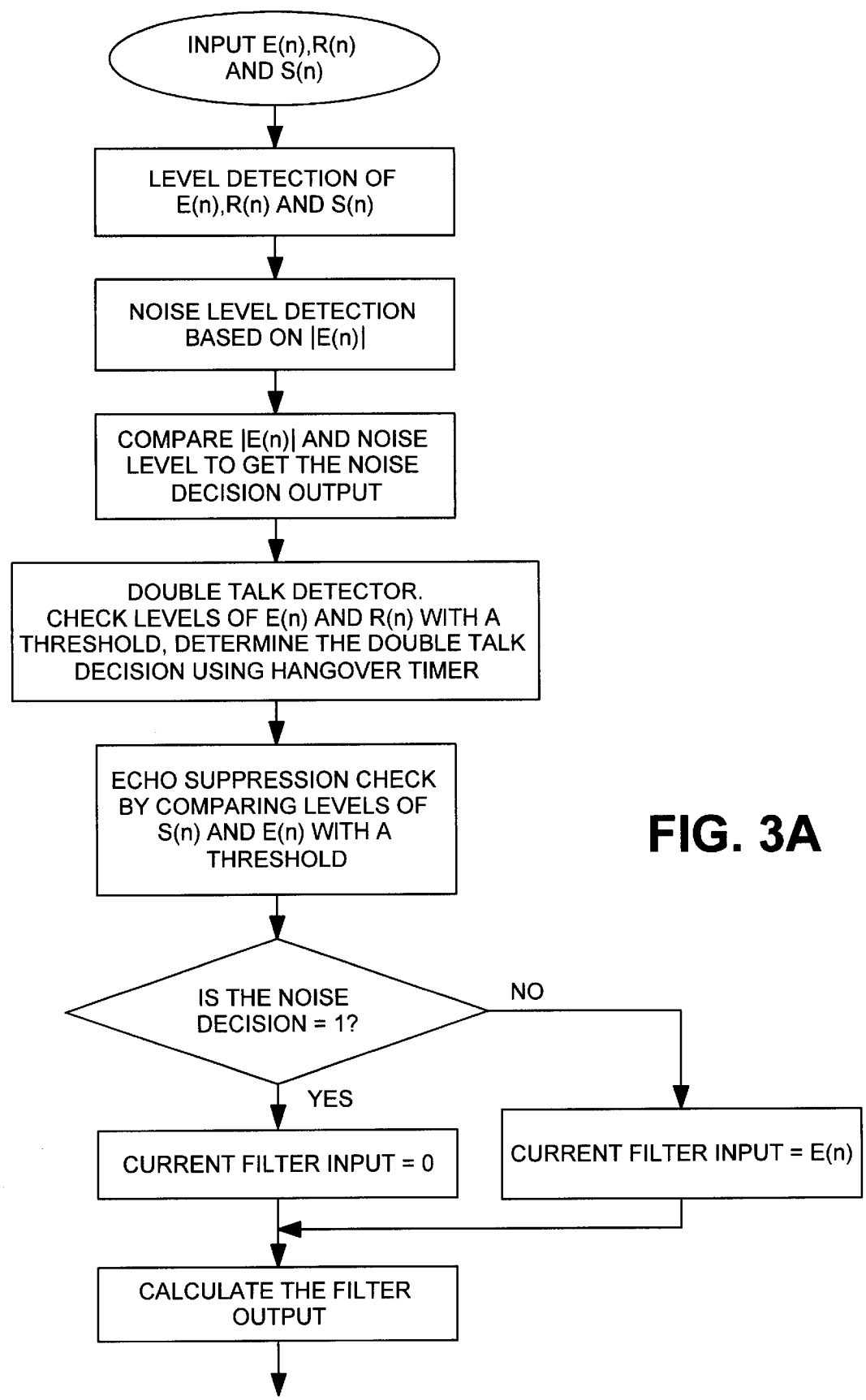
FIGS. 3A and 3B are flow diagrams illustrating the NLP process of the invention.
Figure 3B:
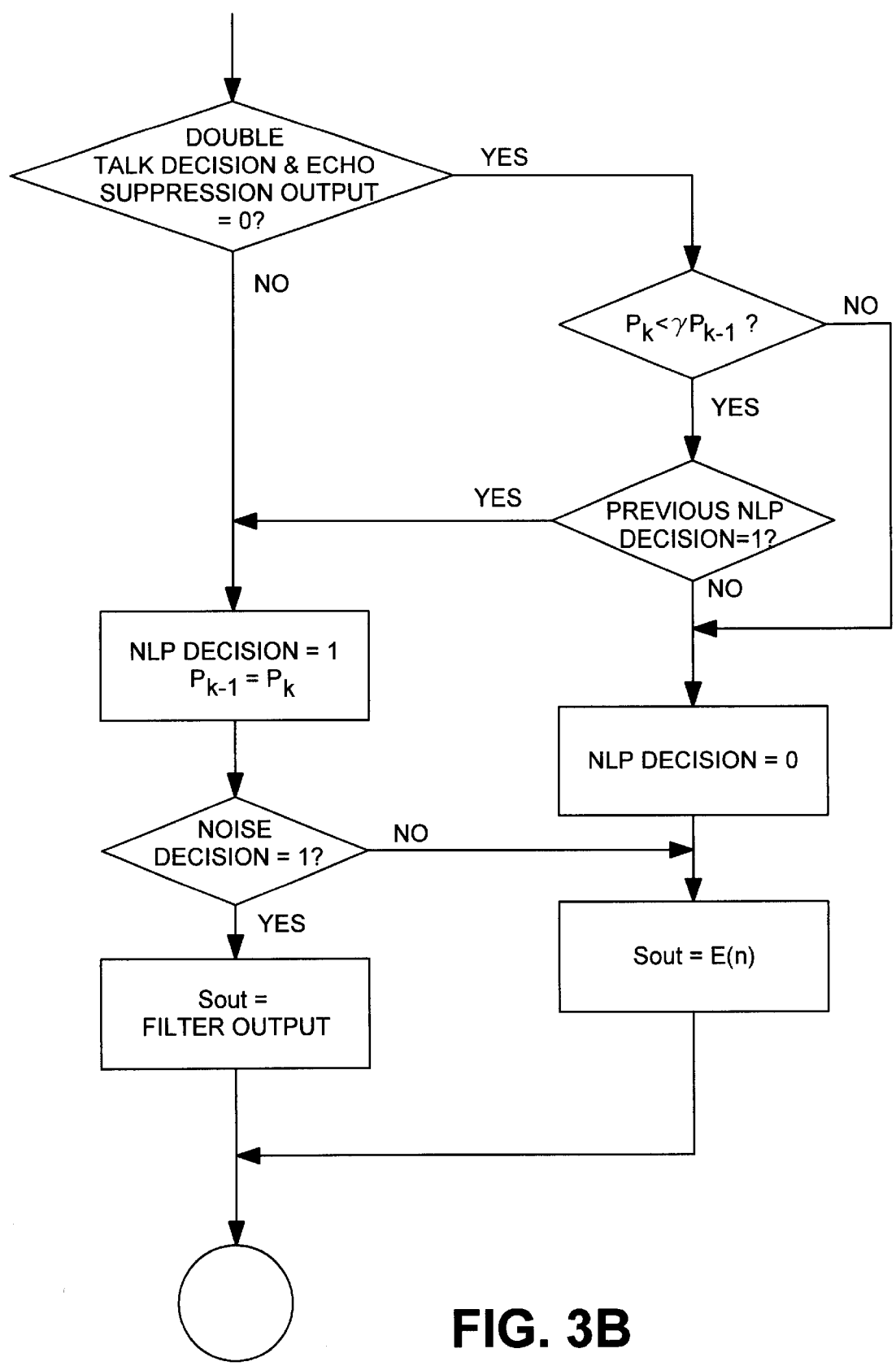

FIG. 3A and 3B is a flowchart setting out the process steps followed by the NLP structure.

According to the present invention various alternatives may be introduced. For example, $P_k$ may choose not to be updated when NLP control is "0" and NLP decision is "1" which means that the NLP is "ON" because of a long echo tail. The advantage of that is that $P_{k-1}$ will not be decreased during the echo tail and it gives a better chance for NLP to remain "ON" to combat a very long echo tail. The NLP will not be released with an occasional level reduction during the echo tail period. The disadvantage is that it may take a little longer to release NLP when both sides of the telephone line are quiet.

Also, all the level calculations can be replaced with energy calculations. The disadvantage of that is that the energy responds slowly in comparison with peak level.

The following sets out some of the parameter selections for the NLP configuration.

1. Threshold for NLP tail decision (γ): Large γ will make it difficult to release NLP when both sides of telephone are quiet. On the other hand, small γ will make it difficult to detect echo tail because the level of echo tail may not decrease strictly monotonically. In some cases, the residual level can be occasionally increased during the echo tail period and NLP can be turned off by these level increase if γ is too small. A suitable value for γ in the acoustical echo cancellation is 1.05.

2. The function of the filter is to replace the missing noise samples. In the acoustic echo environment, the background noise is not white but colored with low pass characteristics. Therefore, a low pass filter should be used to recover noise samples. A simple and efficient filter is a four tap FIR filter with its first coefficient being zero: [0, 0.29469694, 0.34868972, 0.20388524].

3. The double talk threshold ($T_{loss}$) should also be chosen carefully. If it is too large, double talk may not be detected efficiently and if it is too small, NLP may not function well because the double talk detector may give a lot of false double talk indications. A suitable value for $T_{loss}$ is 0.5.

4. The chosen criteria for the double talk hangover timer is the same as double talk threshold. If it is too small, the double talk detector may not work well and a lot of near-end speech clipping can be heard by the far-end listeners. If the hangover timer is too large, it takes a long time to release the double talk decision and NLP may not function well to cut the echo residual effectively. A suitable value for the hangover timer is 400 samples.

5. The threshold for echo suppression ($T_{sup}$) may have a relatively large range. It is a safe protection for the small near end double talk. A very small near-end double talk may not be detected by the double talk detector, but it will seriously deteriorate the echo canceller performance. In such a case, an echo suppression level detection should be employed. A high echo suppression threshold will imply that small double talk in the echo environment may not be detected effectively and a low threshold means that NLP will not turn on easily. With a very low threshold, it will be difficult or at least take a long time to turn the NLP on because the NLP will be activated only when large amount of echo suppression is achieved by the adaptive echo canceller. A suitable value for the threshold is $T_{sup}$ is 0.2.

The following provides some definitions which may assist in an understanding of the invention.

NLP: Nonlinear processor, used to remove or further attenuate residual echo signals after echo cancellation.

Adaptive Filter: An adaptive algorithm to simulate the echo path so that the echo can be removed by subtracting its estimated value.

Double-Talk Detector: detects the condition of double-talk (when both the near-end and the far-end signals exist).

Level Detector: A recursive algorithm to detect the peak averaged value of the signal.

Noise Level Detector: A recursive algorithm to estimate the level of background noise.

While a particular embodiment of the invention has been described and illustrated it will be apparent to one skilled in the art that numerous variations can be made to the basic concept. It is to be understood, however, that such variations will fall within the scope of the invention as defined by the appended claims.

What is claimed is:

1. A method of injecting a background noise signal into a speech path between a near end user and a far end user in a telephone system having an acoustic echo canceller which outputs a residual signal, said background noise signal being injected only if said residual signal is an echo signal, said method comprising:

providing a noise level detector to determine whether said residual signal is greater than a preset noise level threshold;

providing an NLP controller to determine whether said residual signal includes a near end speech;

providing an echo tail controller to determine whether said residual signal represents an echo signal; and injecting said background noise into said speech path only if said residual signal is an echo signal, otherwise outputting said residual signal unaltered.

2. A method of selectively replacing a residual signal from an acoustic echo canceller associated with a telephone terminal with a background noise signal, said method comprising: providing said residual signal to noise decision means in a nonlinear processor (NLP) for comparing said residual signal with an estimated noise level; and passing said residual signal directly through said NLP if it is less than said estimated noise level; otherwise, passing said residual signal to an NLP control means to determine whether said residual signal includes a near end speech signal and if so passing said residual signal through said NLP; if said residual signal is not a near end speech signal determining whether said residual signal is an end echo signal; and if so outputting a signal representing a previous noise signal.

3. A nonlinear processor (NLP) to be connected to an acoustic echo canceller in a telephone terminal, said NLP comprising: input means to receive a residual signal from said echo canceller; noise decision means to determine whether said residual signal is greater than a preset noise level threshold; NLP control means to determine whether said residual signal includes near end speech; an echo tail controller to determine whether said residual signal represents an echo signal; and switch means to pass said residual signal through said NLP in an unaltered state if it is greater than said noise threshold level and includes near end speech and to replace said residual signal with a background noise signal if said residual signal represents an echo signal.

4. A nonlinear processor as defined in claim 3 wherein said echo signal includes a long term echo signal.

5. A non linear processor (NLP) for use with an acoustic echo canceller in a telephone system to detect an echo signal in a residual signal delivered by said acoustic echo canceller and to inject a background noise signal into a speech path between a near end user and a far end user upon detection of an echo signal, said NLP comprising: a first input to receive said residual signal; a second input to receive a reference signal representing a signal from said far end user; a third input for receiving a near end signal from a terminal of said near end user; an output for delivering a NLP output to said far end user; a noise level threshold detector to determine whether said residual signal is greater than a threshold level; a NLP controller to determine whether said residual signal includes speech signals; an echo tail controller to determine whether said residual is an echo signal; and means to inject said background noise into said speech path only when said residual signal is an echo signal.

6. A NLP as defined in claim 5 having a filter to provide said background noise signal.

7. A non linear processor (NLP) for use with an acoustic echo cancellor associated with a telephone a telephone terminal to selectively replace residual signals from said echo canceller with a background noise signal, said NLP comprising: a first input to receive said residual signal; a second input to receive a reference signal representing a signal from a far end user; a third input for receiving a near end signal from a microphone in said terminal; an output for delivering an output to a far end user; a NLP switch, switchable between a first position wherein said residual signal is passed directly to said output and a second position wherein a background noise signal representing a previous noise signal is delivered to said output; noise decision means to determine whether an absolute value of said residual signal is above a noise level threshold; NLP control means to determine whether said residual signal includes speech signals; echo tail control means to determine whether said residual signal is an echo signal; and NLP decision means cooperating with said noise decision means, said NLP control means and said echo tail control means to switch said NLP switch to said second position when said residual signal is above said noise level threshold and is determined to be an echo signal and to said first position otherwise.

8. A NLP as defined in claim 7 having a filter means to derive said background noise signal.

9. A NLP as defined in claim 7 including timer means in said NLP control means to delay switching said NLP switch until after a preset time interval has passed.

10. A NLP as defined in claim 7 wherein said echo tail control means includes means to determine whether said residual signal is a long echo.

* * * * *